(12) United States Patent
Vollmer et al.

(10) Patent No.: US 11,215,235 B2
(45) Date of Patent: Jan. 4, 2022

(54) COUPLING ELEMENT HAVING VIBRATION DAMPING

(71) Applicant: SIEMENS AKTIENGESELLSCHAFT, Munich (DE)

(72) Inventors: Rolf Vollmer, Gersfeld (DE); Matthias Braun, Weichtungen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 158 days.

(21) Appl. No.: 16/491,436

(22) PCT Filed: Feb. 9, 2018

(86) PCT No.: PCT/EP2018/053252
§ 371 (c)(1),
(2) Date: Sep. 5, 2019

(87) PCT Pub. No.: WO2018/162171
PCT Pub. Date: Sep. 13, 2018

(65) Prior Publication Data
US 2020/0032850 A1 Jan. 30, 2020

(30) Foreign Application Priority Data
Mar. 7, 2017 (EP) .................................. 17159627

(51) Int. Cl.
*F16D 3/12* (2006.01)
*B33Y 80/00* (2015.01)
(Continued)

(52) U.S. Cl.
CPC ................ *F16D 3/12* (2013.01); *B33Y 80/00* (2014.12); *F16D 3/04* (2013.01); *F16D 3/72* (2013.01);
(Continued)

(58) Field of Classification Search
CPC ...... F16D 3/00; F16D 3/02; F16D 3/04; F16F 15/02; F16F 9/30
See application file for complete search history.

(56) References Cited

U.S. PATENT DOCUMENTS 3,800,555 A * 4/1974 Arneson ................. F16F 15/10
464/138
4,286,442 A * 9/1981 Peterson ................... F16D 3/04
464/102
(Continued)

FOREIGN PATENT DOCUMENTS

CN 1035347 A 9/1989
CN 1083187 A 3/1994
(Continued)

OTHER PUBLICATIONS

Machine Translation of EP-2169245-A1 (Year: 2010).*
(Continued)

*Primary Examiner* — Jacob J Cigna
(74) *Attorney, Agent, or Firm* — Henry M. Feiereisen LLC

(57) ABSTRACT

A coupling for connection of an encoder to an electrical machine includes an encoder shaft end piece for coupling to a shaft of the encoder, and a machine shaft end piece for coupling to a shaft of the electrical machine. At least one of the end pieces has a carrier which is formed with a cavity filled with granular material, preferably steel powder, to effect a dampening of vibrations and impacts.

9 Claims, 2 Drawing Sheets

(51) Int. Cl.
  *F16D 3/04* (2006.01)
  *F16D 3/72* (2006.01)
  *B33Y 10/00* (2015.01)
  *B22F 10/20* (2021.01)

(52) U.S. Cl.
  CPC ........... *B22F 10/20* (2021.01); *B22F 2301/35* (2013.01); *B33Y 10/00* (2014.12); *F16D 2200/006* (2013.01); *F16D 2200/0021* (2013.01); *F16D 2200/0034* (2013.01); *F16D 2250/00* (2013.01); *F16D 2300/22* (2013.01)

(56) References Cited

U.S. PATENT DOCUMENTS

| | | | | |
|---|---|---|---|---|
| 5,267,903 | A * | 12/1993 | Kuribayashi | F16D 3/04 |
| | | | | 464/104 |
| 5,284,455 | A | 2/1994 | Kuribayashi | |
| 6,179,716 | B1 | 1/2001 | Asa | |
| 6,547,049 | B1 * | 4/2003 | Tomlinson | F16F 7/01 |
| | | | | 188/379 |
| 6,736,423 | B2 * | 5/2004 | Simonian | B62D 7/222 |
| | | | | 280/731 |
| 7,004,294 | B2 * | 2/2006 | Williams | F16F 15/145 |
| | | | | 188/378 |
| D842,351 | S * | 3/2019 | Hart | D15/138 |
| 2008/0119294 | A1 * | 5/2008 | Erikson | F16D 3/04 |
| | | | | 464/104 |
| 2009/0230825 | A1 | 9/2009 | Braun et al. | |
| 2009/0258168 | A1 * | 10/2009 | Barcock | B22F 10/20 |
| | | | | 427/596 |
| 2012/0024646 | A1 * | 2/2012 | Tsugihashi | F16F 7/015 |
| | | | | 188/268 |
| 2013/0233669 | A1 | 9/2013 | Zhao et al. | |
| 2019/0011014 | A1 * | 1/2019 | Zouani | F16F 15/262 |

FOREIGN PATENT DOCUMENTS

| | | | |
|---|---|---|---|
| CN | 1227894 A | 9/1999 | |
| CN | 101302703 A | 11/2006 | |
| CN | 201076425 Y | 6/2008 | |
| CN | 101338806 A | 1/2009 | |
| CN | 103307125 A | 9/2013 | |
| CN | 204344716 U | 5/2015 | |
| CN | 105202092 A | 12/2015 | |
| DE | 33 11 115 C1 | 10/1984 | |
| DE | 10 2006 043 897 A1 | 3/2008 | |
| EP | 2 169 245 B1 | 3/2010 | |
| EP | 2169245 A1 * | 3/2010 | ............... F16D 3/04 |
| GB | 210747 A * | 7/1924 | ............... F16D 3/04 |
| JP | H06 288463 A | 10/1994 | |
| JP | 2001/206221 A | 7/2001 | |

OTHER PUBLICATIONS

*PCT International Search Report and Written Opinion of International Searching Authority* dated May 6, 2018 corresponding to PCT International Application No. PCT/EP2018/053252 filed Sep. 2, 2018.

Njifulov, A. C. et al.; "Acoustic Design Of Hull Structure."; National Defence Industry Press; Beijing: pp. 1-10; ISBN: 7-118-01794-9; (1998).

* cited by examiner

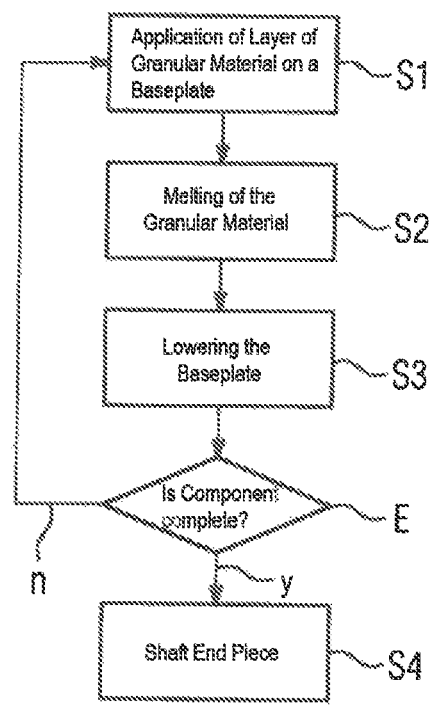

COUPLING ELEMENT HAVING VIBRATION DAMPING

CROSS-REFERENCES TO RELATED APPLICATIONS

This application is the U.S. National Stage of International Application No. PCT/EP2018//053252, filed Feb. 9, 2018, which designated the United States and has been published as International Publication No. WO 2018/162171 and which claims the priority of European Patent Application, Serial No. 17159627.3, filed Mar. 7, 2017, pursuant to 35 U.S.C. 119(a)-(d).

BACKGROUND OF THE INVENTION

The invention relates to a coupling for connection of an encoder to an electrical machine, wherein the coupling comprises an encoder shaft end piece, which can be coupled to an encoder shaft, and a machine shaft end piece, which can be coupled to a machine shaft, and wherein at least one end piece has at least one carrier. The invention further relates to a suitable production method and the use of such a coupling as well as a shaft end piece.

If an encoder is connected to an electrical machine by means of a coupling element, an oscillating system results from the coupling and the mass inertia of the encoder. Excess vibration stresses can consequently occur in the resonance.

Electrical machines have hitherto been operated beneath the resonance or else filters were used that prevent excitation in the resonance point. However, operation beneath the resonance restricts the dynamics, while operation with a filter restricts the computing power of the controller.

A shaft coupling and a method for coupling an encoder which has an encoder shaft to an electrical machine which has a machine shaft is known from patent specification EP2169245B1, wherein the shaft coupling comprises:
  an encoder shaft end piece which can be coupled to the encoder shaft,
  a machine shaft end piece which can be coupled to the machine shaft and
  a torque transmission element,
wherein to couple the encoder shaft to the machine shaft the encoder shaft end piece is arranged opposite the machine shaft end piece and the torque transmission element is arranged between the encoder shaft end piece and the machine shaft end piece.

A similar shaft coupling also emerges from the publication DE102006043897A1.

Patent specification JP 2001206221 A discloses a rotating unbalance component in a shaft coupling, which is provided between a gearbox and a motor for driving an axle of a rail vehicle. Granular material 85 is here sealed in cylindrical containers 75, 76 of a shaft coupling 70.

The object of the invention is to create a coupling which preferably comprises at least one encoder shaft end piece and at least one machine shaft end piece and which effects a damping of introduced vibrations and impacts. The invention further has the object of creating a corresponding shaft end piece.

SUMMARY OF THE INVENTION

The object is achieved by a coupling for connecting an encoder to an electrical machine, wherein the coupling comprises an encoder shaft end piece, which can be coupled to an encoder shaft, and a machine shaft end piece, which can be coupled to a machine shaft, wherein at least one of the end pieces has at least one carrier, wherein the carrier has at least one fully enclosed cavity filled with granular material.

The object is further achieved by a method for manufacturing a shaft end piece, in which at least one cavity is formed, in which granular material remains or is added.

Moreover, the object is achieved by the use of a coupling for damping vibrations and impacts.

Furthermore, the object relating to the shaft end piece is achieved by a shaft end piece for a coupling, wherein the shaft end piece has at least one carrier and wherein the carrier has at least one fully enclosed cavity filled with granular material.

Further advantageous embodiments emerge from the dependent claims.

The invention has the advantage that the granular material located in the cavities of the shaft end pieces damps impacts and vibrations. Excess vibration stresses occur in particular in the resonance and are caused by the oscillating system comprising coupling and mass inertia of the encoder, and can be damped in this way. This means a damping of the transmission function in the resonance point, as a result of which the electrical machine can be operated in an expanded frequency range and electronic filter measures can be dispensed with.

The torque transmission element is inserted between the encoder shaft end piece and the machine shaft end piece. This brings about a reduction in friction and is preferably embodied as a plastic component.

To prevent an imbalance, each end piece has preferably two carriers. Each carrier has preferably exactly one fully enclosed cavity, which is preferably completely filled with granular material. The size of the cavity is defined by the application, since the rigidity of the end piece decreases as the size of the cavity increases. The encoder shaft end piece or machine shaft end piece must however withstand the application-specific requirements.

Steel is particularly well suited, among other things because of its strength and resilience, as a material for the end pieces and/or steel powder as granular material for filling the cavities in the carriers.

An additive production method, preferably selective laser melting (SLM) or selective laser sintering (SLS), is particularly suitable as a method for manufacturing a shaft end piece, preferably embodied as an end piece of an encoder shaft or machine shaft, in which at least one completely enclosed cavity is formed, in which granular material remains or is added.

In SLS or Stall the end piece is built up in layers from granular material and a cavity is recessed. Steel powder is especially suitable as granular material. Advantageously the layered structure is implemented such that the component is produced layer by layer and the granular material, which is not fused in the cavity, remains in the cavity layer by layer. The end piece and the filling of the cavities thus consist, according to a preferred form of embodiment, of the same material.

BRIEF DESCRIPTION OF THE DRAWING

The invention is described and explained in more detail below on the basis of the exemplary embodiments shown in the figures, in which:

FIG. 3 shows the sequence of the production method.

DETAILED DESCRIPTION OF PREFERRED EMBODIMENTS

Figure 1:
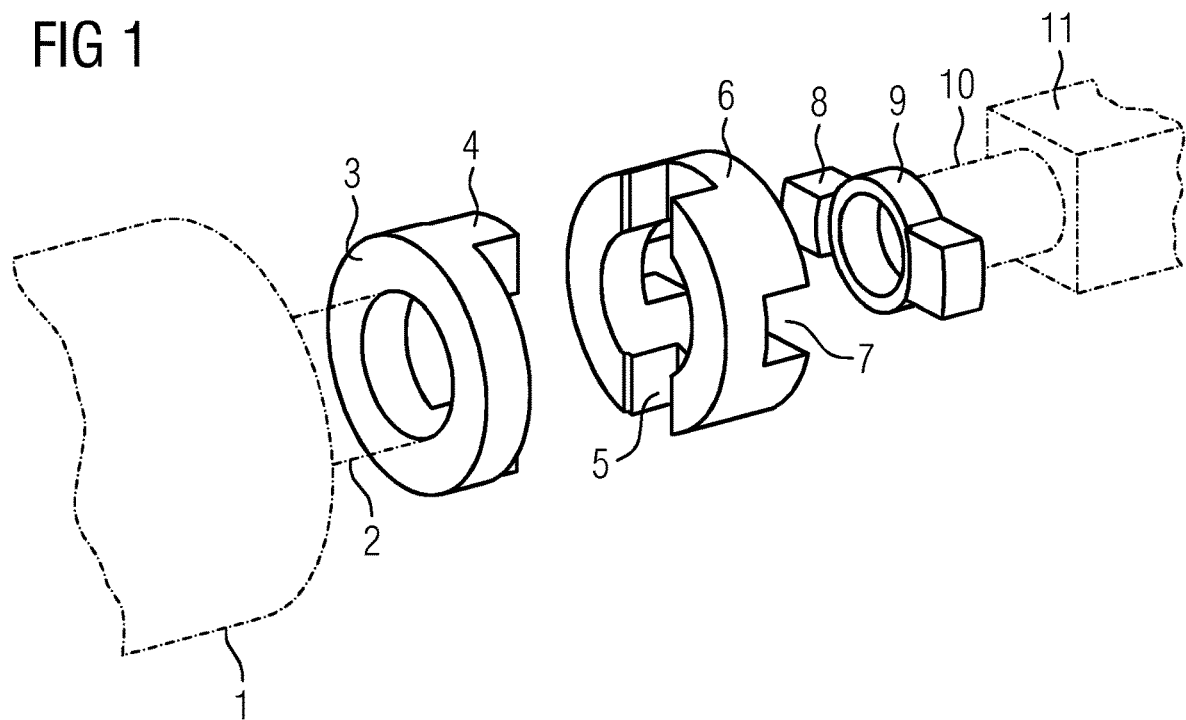
FIG. 1 shows an embodiment of a coupling consisting of an encoder shaft end piece, a torque transmission element and a machine shaft end piece for connecting an encoder to an electrical machine.

FIG. 1 shows an embodiment of a coupling for connecting an encoder 11 with an encoder shaft 10 to an electrical machine 1 with a machine shaft 2. The coupling comprises an encoder shaft end piece 9, a machine shaft end piece 3 and a torque transmission element 6. The encoder shaft end piece 9 has two carriers 8 that extend from an enclosed region that couples the encoder shaft end piece 9 to the encoder shaft 10. The machine shaft end piece 3 has two carriers 4 that extend from an enclosed region that couples the machine shaft end piece 3 to the machine shaft 2. The carriers 8 of the encoder shaft end piece 9 are coupled to the slot 7 of the torque transmission element 6, the carriers 4 of the machine shaft end piece 3 are coupled to the slot 5 of the torque transmission element 6.

Figure 2:
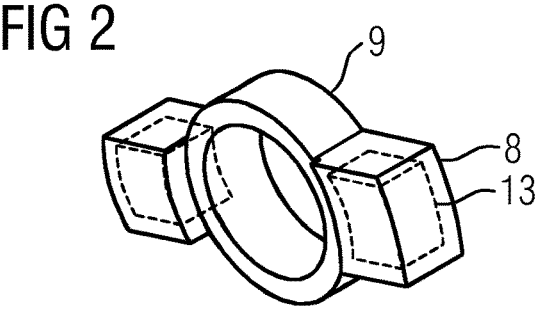
FIG. 2 shows an embodiment of the two end pieces, which are provided with powder-filled cavities.
Figure 2:
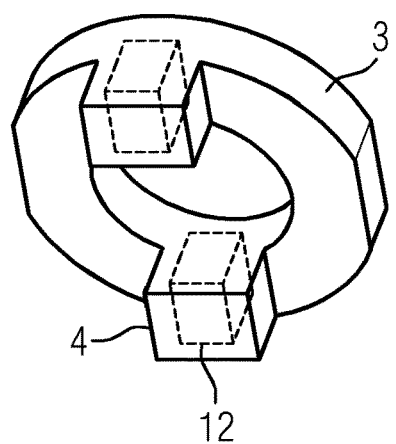

FIG. 2 shows an embodiment of the encoder shaft end piece 9 and of the machine shaft end piece 3. The encoder shaft end piece 9 has two carriers 8 extending in a radial manner from the enclosed region that couples the encoder shaft end piece 9 to the encoder shaft 10, which are each provided with a powder-filled cavity 13. The machine shaft end piece 3 has two carriers 4 extending in an axial manner from the enclosed region that couples the machine shaft end piece 3 to the machine shaft 2, which are each provided with a powder-filled cavity 12.

FIG. 3 describes the sequence of the production method. As is customary in an additive production method, a doctor blade first applies a thin layer of granular material, preferably steel powder, onto a baseplate during the selective laser melting in a first method step S1. Then according to the technical specification the powder is melted by means of laser radiation and after setting forms a solid material layer. Powder which has not been fused remains there in method step S2 and is not blown out. Then in method step S3 the baseplate is lowered by the amount of the layer thickness and powder is again applied in method step S1, if during the status inquiry E it is established that the component has not yet been completed, characterized in FIG. 3 by n. These procedures are repeated layer by layer. During the layered construction of the end piece a cavity becomes apparent, which is not blown out in method step S2. The procedures are repeated until the end piece is completed as per specification in method step S4, characterized in FIG. 3 by y. The result is a shaft end piece which has a cavity that is filled with the steel powder.

The invention claimed is:

1. A coupling for connecting an encoder to an electrical machine, said coupling comprising:
    an encoder shaft end piece configured for coupling to a shaft of the encoder;
    a machine shaft end piece configured for coupling to a shaft of the electric machine; wherein at least one member selected from the group consisting of the encoder shaft end piece and the machine shaft end piece includes a carrier formed in one piece with the member, said carrier extending from the member and having a fully enclosed cavity;
    a granular material filled in the cavity; and
    a torque transmission element mounted between the encoder shaft end piece and the machine shaft end piece, wherein the carrier is coupled to a slot of the torque transmission element.

2. The coupling of claim 1, wherein the torque transmission element is made of plastic.

3. The coupling of claim 1, constructed for damping vibrations or impacts.

4. The coupling of claim 1, constructed for damping excess vibration stress at a resonance frequency caused by an oscillating system comprised of the coupling and a mass inertia of the encoder connected to the coupling.

5. The coupling of claim 1, wherein the shaft end piece has exactly two carriers.

6. The coupling of claim 1, wherein the carrier has exactly one cavity filled with the granular material.

7. The coupling of claim 1, wherein the end pieces are formed from steel.

8. The coupling of claim 1, wherein the granular material completely fills the cavity.

9. The coupling of claim 1, wherein the granular material is steel powder.

* * * * *